United States Patent
Yang et al.

(10) Patent No.: US 12,515,827 B2
(45) Date of Patent: Jan. 6, 2026

(54) AIRFRAME STRUCTURE AND UNMANNED AERIAL VEHICLE THEREOF WITH UPPER AND LOWER VERTICAL TAIL WINGS

(71) Applicant: XIHUA UNIVERSITY, Chengdu (CN)

(72) Inventors: Wei Yang, Chengdu (CN); Chunpeng He, Chengdu (CN); Zhiliang Zhao, Chengdu (CN); Yi Zhang, Chengdu (CN); Xingyang Tan, Chengdu (CN); Liang Chen, Chengdu (CN); Rui Du, Chengdu (CN); Peng Hu, Chengdu (CN); Xiaoyue Lai, Chengdu (CN)

(73) Assignee: XIHUA UNIVERSITY, Chengdu (CN)

( * ) Notice: Subject to any disclaimer, the term of this patent is extended or adjusted under 35 U.S.C. 154(b) by 67 days.

(21) Appl. No.: 18/555,915

(22) PCT Filed: Oct. 12, 2023

(86) PCT No.: PCT/CN2023/124274
§ 371 (c)(1),
(2) Date: Nov. 30, 2024

(87) PCT Pub. No.: WO2024/156193
PCT Pub. Date: Aug. 2, 2024

(65) Prior Publication Data
US 2025/0333196 A1    Oct. 30, 2025

(30) Foreign Application Priority Data
Jan. 29, 2023  (CN) .......................... 202310044047.7

(51) Int. Cl.
*B64U 10/20* (2023.01)
*B64U 20/77* (2023.01)
(Continued)

(52) U.S. Cl.
CPC ............. *B64U 10/20* (2023.01); *B64U 20/77* (2023.01); *B64U 30/10* (2023.01); *B64U 30/40* (2023.01)

(58) Field of Classification Search
CPC ........ B64U 10/20; B64U 20/77; B64U 30/10; B64U 30/40; B64C 29/02; B64C 5/00; B64C 5/02; B64C 5/08; B64C 39/08
See application file for complete search history.

(56) References Cited

U.S. PATENT DOCUMENTS

| 11,420,738 | B1 * | 8/2022 | Thalheimer | .............. | B60V 1/22 |
| 11,787,539 | B2 * | 10/2023 | Li | ............................ | B64C 9/00 244/7 A |

(Continued)

FOREIGN PATENT DOCUMENTS

| CN | 106864747 A | * | 6/2017 | ............. | B64C 1/068 |
| CN | 114148516 A | * | 3/2022 | ............. | B64C 5/02 |
| CN | 118025532 A | * | 5/2024 | ............. | B64D 47/02 |

OTHER PUBLICATIONS

"Is my crank balanced"? and Target Bobweight Explained, Eagle https://eaglerod.com/balancing.*

*Primary Examiner* — Arfan Y. Sinaki
(74) *Attorney, Agent, or Firm* — Central California IP Group, P.C.; Andrew D. Fortney

(57) ABSTRACT

An airframe structure and an unmanned aerial vehicle thereof is disclosed, which belongs to the technical field of the unmanned aerial vehicle. The airframe structure includes: a main airframe; at least two main wings, which are symmetrically provided on the two sides of the main airframe, and which are provided with a propeller and a motor to provide power to the propeller; an upper vertical tail wing, which is provided at the upper end of the main airframe; and a lower vertical tail wing, which is provided at the lower end of the main airframe. The characteristics of (Continued)

a fixed-wing unmanned aerial vehicle and a multi-rotor-wing unmanned aerial vehicle are considered.

7 Claims, 15 Drawing Sheets

(51) Int. Cl.
*B64U 30/10* (2023.01)
*B64U 30/40* (2023.01)

(56) References Cited

U.S. PATENT DOCUMENTS

| | | | | |
|---|---|---|---|---|
| 2015/0344135 | A1* | 12/2015 | Alber | B64U 70/80 244/12.4 |
| 2022/0315215 | A1* | 10/2022 | Li | B64U 10/20 |
| 2022/0324560 | A1* | 10/2022 | Klinker | B64C 35/006 |
| 2022/0382300 | A1* | 12/2022 | Larson | G01S 15/87 |
| 2024/0043144 | A1* | 2/2024 | Maldonado | B64U 10/70 |

* cited by examiner

AIRFRAME STRUCTURE AND UNMANNED AERIAL VEHICLE THEREOF WITH UPPER AND LOWER VERTICAL TAIL WINGS

CROSS-REFERENCE TO RELATED APPLICATIONS

This application is a national phase application of International Pat. Appl. No. PCT/CN2023/124274, filed on Oct. 12, 2023, which claims the benefit of Chinese Pat. Appl. No. 2023100440477, filed on Jan. 29, 2023, both of which are incorporated herein by reference as if fully set forth herein.

TECHNICAL FIELD

The present invention relates to the technical field of an unmanned aerial vehicle, and specifically, to an airframe structure and an unmanned aerial vehicle thereof.

BACKGROUND

An unmanned aerial vehicle is usually divided into two types based on a flight state. One is a multi-rotor-wing unmanned aerial vehicle that takes off vertically; and the other is a fixed-wing unmanned aerial vehicle that requires an assisted takeoff. The multi-rotor-wing unmanned aerial vehicle has low requirements for a site and can take off and land directly vertically, but consume high energy and has a short endurance mileage. The fixed-wing unmanned aerial vehicle has high requirements for the site and need to provide a flat runway, but fly with low energy consumption, a high rate, and a long endurance mileage.

For this reason, the unmanned aerial vehicle provided in the prior art usually takes off vertically and then flies horizontally. For example, for Patent No. CN105346715A, a vertical takeoff and landing unmanned aerial vehicle discloses an unmanned aerial vehicle that can both vertically take off. In a case of a long-distance flight, a flight mode of the fixed-wing unmanned aerial vehicle is adopted to increase the fight endurance and flight speed of the unmanned aerial vehicle.

However, when the unmanned aerial vehicle provided by the technical solution is transformed from a vertical flight state to a horizontal flight state, the disturbance and turbulence generated in the vicinity of a propeller of a main wing of the unmanned aerial vehicle affect the stability of flight, which in turn leads to a high crash rate of the unmanned aerial vehicle.

In summary, there is a lack of an airframe structure and an unmanned aerial vehicle on the market that can take into account the characteristics of both of the fixed-wing unmanned aerial vehicle and the multi-rotor-wing unmanned aerial vehicle, as well as reduce the impact of turbulence and disturbance on stability caused by the propeller of the main wing when the unmanned aerial vehicle are transformed from the vertical flight state to the horizontal flight state.

SUMMARY

The content section of the present application is used to present in brief form ideas that are described in detail later in the specific embodiment section. The content section of the present application is not intended to identify the key features or necessary features of the technical solution for which protection is claimed, nor is it intended to be used to limit the scope of the technical solution for which protection is claimed.

As a first aspect of the present application, to solve the technical problems mentioned in the technical background section above, some embodiments of the present application provide an airframe structure, including:
a main airframe;
at least two main wings, which are symmetrically provided on the two sides of the main airframe, and which are provided with a propeller and a motor to provide power to the propeller;
an upper vertical tail wing, which is provided at the upper end of the main airframe; and
a lower vertical tail wing, which is provided at the lower end of the main airframe.

The upper vertical tail wing is provided thereon with a horizontal tail wing. The at least two horizontal tail wings are disclosed. The two horizontal tail wings are provided on the left and right sides of the upper vertical tail wing. A direction of arrangement of an airfoil of the horizontal tail wing and a direction of arrangement of an airfoil of the upper vertical tail wing are perpendicular to each other. The direction of arrangement of the airfoil of the horizontal tail wing and the direction of arrangement of the airfoil of the main wing are parallel to each other.

When an aircraft is transformed from a vertical flight state to a horizontal flight state, a lot of turbulence and disturbance is generated in the tip of the main wing 102 and at the position of the propeller. The horizontal tail wing can block these turbulence and disturbance (constraining a generated airflow), so that the aircraft is more stable when the aircraft is transformed from the vertical flight state to the horizontal flight state.

Further, the main wing and the horizontal tail wing are NACA airfoils. This airfoil is the common airfoil for a jet airplane. The horizontal tail wing and the main wing are provided as this airfoil to be able to provide good stability in level flight.

Further, a projection of the horizontal tail wing on the surface of the main wing is located on the main wing. The horizontal tail wing and the main wing overlap each other, enabling wingtip vortices generated by the main wing to be maximally shielded by the horizontal tail wing as the airframe turns from vertical takeoff to level flight.

Further, a distance a from an end of the horizontal tail wing to a symmetry plane of the main airframe is disclosed, and a distance b from an end of the main wing to the symmetry plane of the main airframe is disclosed, and a:b=(30-35):(95-100).

Further, a horizontal distance c from an axis of rotation of the propeller to the symmetry plane of the main airframe is disclosed, and a:c=(30-35):(45-50).

This ratio of the horizontal tail wing and the main wing enables the horizontal tail wing to avoid the impact on the airframe structure if the horizontal tail wing is too long in a case of being able to meet the requirements of blocking the disturbance and turbulence generated by the propeller.

Further, a vertical distance d from a bottom surface of the horizontal tail wing to a tip of the main wing is disclosed, and a:c=32:36.

The ratio, which ensures that the distance between the horizontal tail wing and the main wing is in a proper position, makes it possible to ensure that a thrust and a lift force are in a stable range in a case of ensuring the effects of turbulence and disturbances generated by the propeller.

Further, the lower vertical tail wing and the horizontal tail wing are the NACA airfoils. The NACA airfoil has more excellent hydrodynamics and can reduce the resistance of flight.

Further, the horizontal tail wing is located in the middle of the upper vertical tail wing. The horizontal tail wing is located in the middle of the upper vertical tail wing, which can increase the strength of the connecting portion of the horizontal tail wing and the upper vertical tail wing, and avoid the horizontal tail wing from bending due to airflow.

Further, the lower vertical tail wing is provided with a bob-weight assembly. The bob-weight assembly can make the mass of the airframe evenly distributed, avoiding the flight instability caused by the mass difference between a side with the horizontal tail wing and a side without the horizontal tail wing after the horizontal tail wing is added.

As a second aspect of the present application, to solve the technical problems mentioned in the above technical background section, some embodiments of the present application provide an airframe structure an unmanned aerial vehicle, including the airframe structure as previously described.

The beneficial effect of the present application is to provide an airframe structure and a unmanned aerial vehicle thereof that can take into account the characteristics of a fixed-wing unmanned aerial vehicle and a multi-rotor-wing unmanned aerial vehicle, and at the same time avoid the turbulence and disturbance generated by a propeller of a main wing of the unmanned aerial vehicle for the stability of the unmanned aerial vehicle when the unmanned aerial vehicle is transformed from a vertical flight state to a horizontal flight state.

BRIEF DESCRIPTION OF THE DRAWINGS

The accompanying drawings, which form a part of the present application, are used to provide a further understanding of the present application, making other features, objectives and advantages of the present application more apparent. The accompanying drawings of schematic embodiments of the present application and the description thereof are used to explain the present application and do not constitute an undue limitation of the present application.

Further, throughout the accompanying drawings, the same or similar reference numbers indicate the same or similar elements. It should be understood that the accompanying drawings are schematic and that element members and elements are not necessarily drawn to scale.

In the FIGURES:

FIG. 1 is a three-dimensional view of an airframe structure in some embodiments of the present application, showing the airframe structure viewed from the upper left side downward;

FIG. 2 is a left view of an airframe structure in some embodiments of the present application, being labeled with a central axis A-A, a first rotating body α and a second rotating body β;

FIG. 3 is an airframe structure transformed from vertical takeoff to horizontal flight in some embodiments of the present application;

FIG. 4 is a top view of an airframe structure in some embodiments of the present application, showing the airframe structure viewed from the upper left side downward;

FIG. 5 is a rear view of an airframe structure in some embodiments of the present application, showing a schematic view of the airframe structure viewed from the rear to the front, and being labeled with the dimensions of part of the structure.

FIG. 6 is a three-dimensional view of an airframe structure in some embodiments of the present application, showing the airframe structure viewed from the upper left downward, and being labeled with the position of a bob-weight assembly.

FIG. 7 is a dynamic pressure diagram for Experimental group 1;

FIG. 8 is a lift diagram for Experimental group 1;

FIG. 9 is a thrust diagram for Experimental group 1;

FIG. 10 is a vector diagram for Experimental group 1;

FIG. 11 is a dynamic pressure diagram for Experimental group 2;

Figure 12:
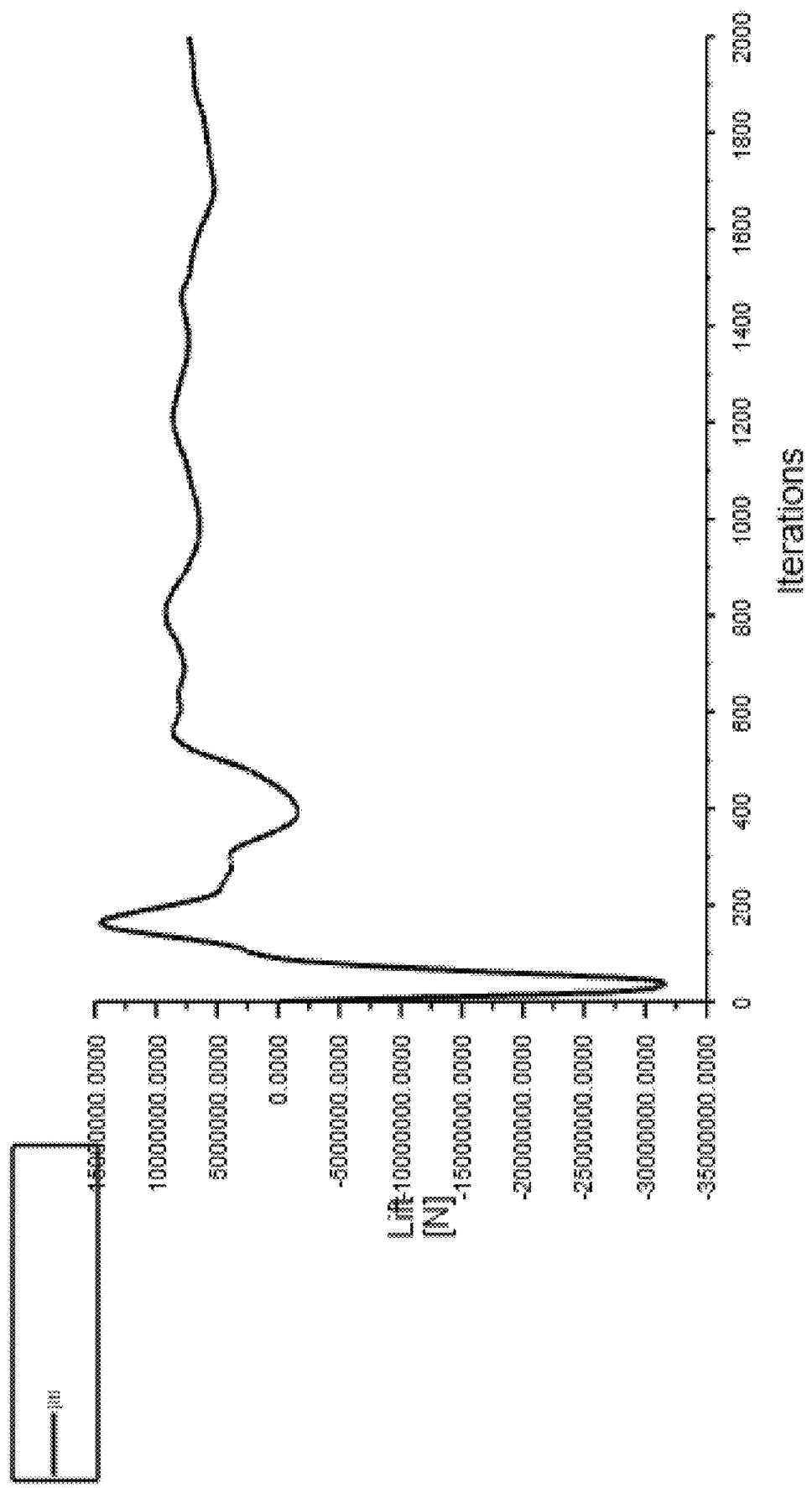
Figure 13:
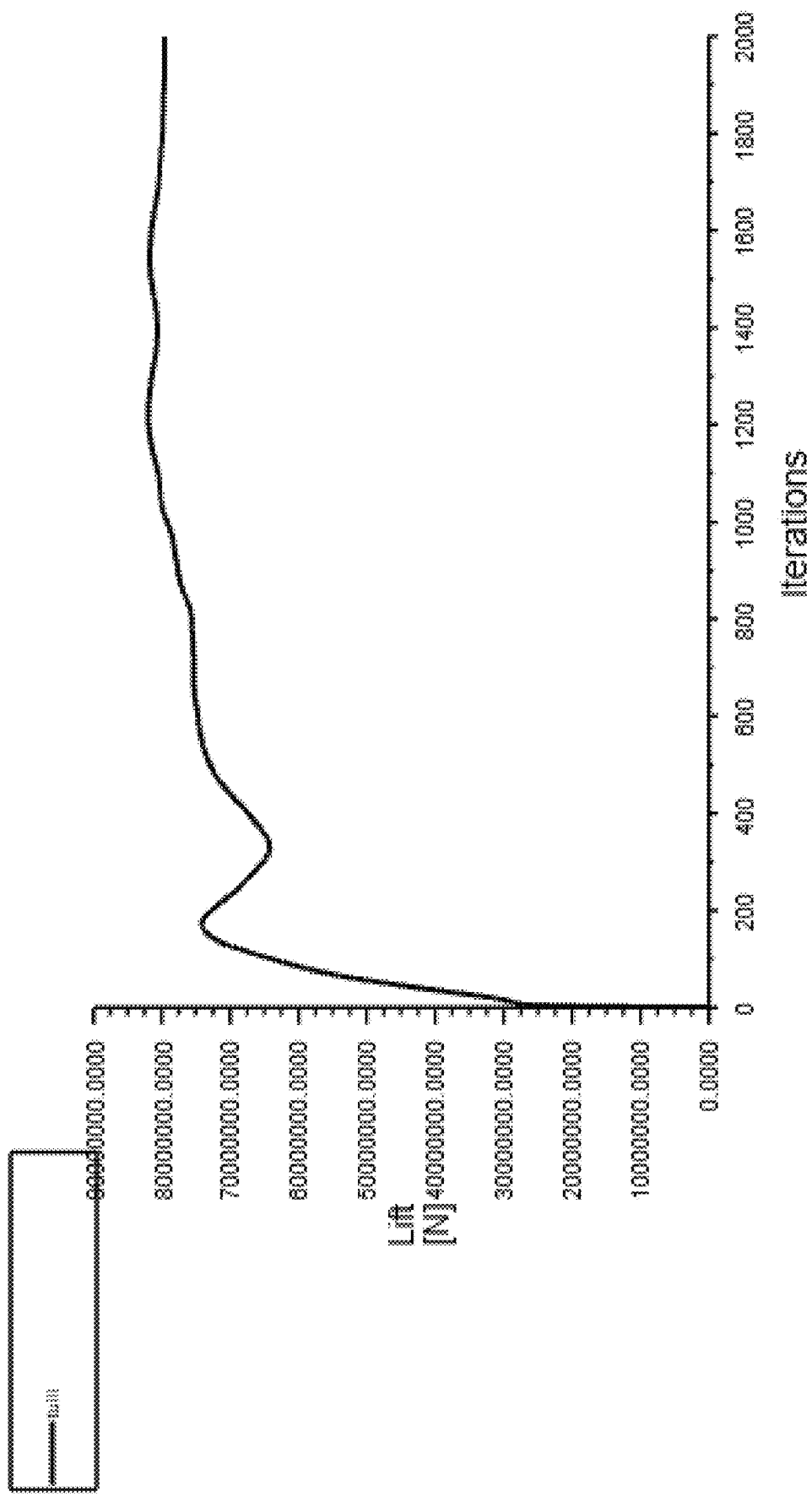
Figure 14:
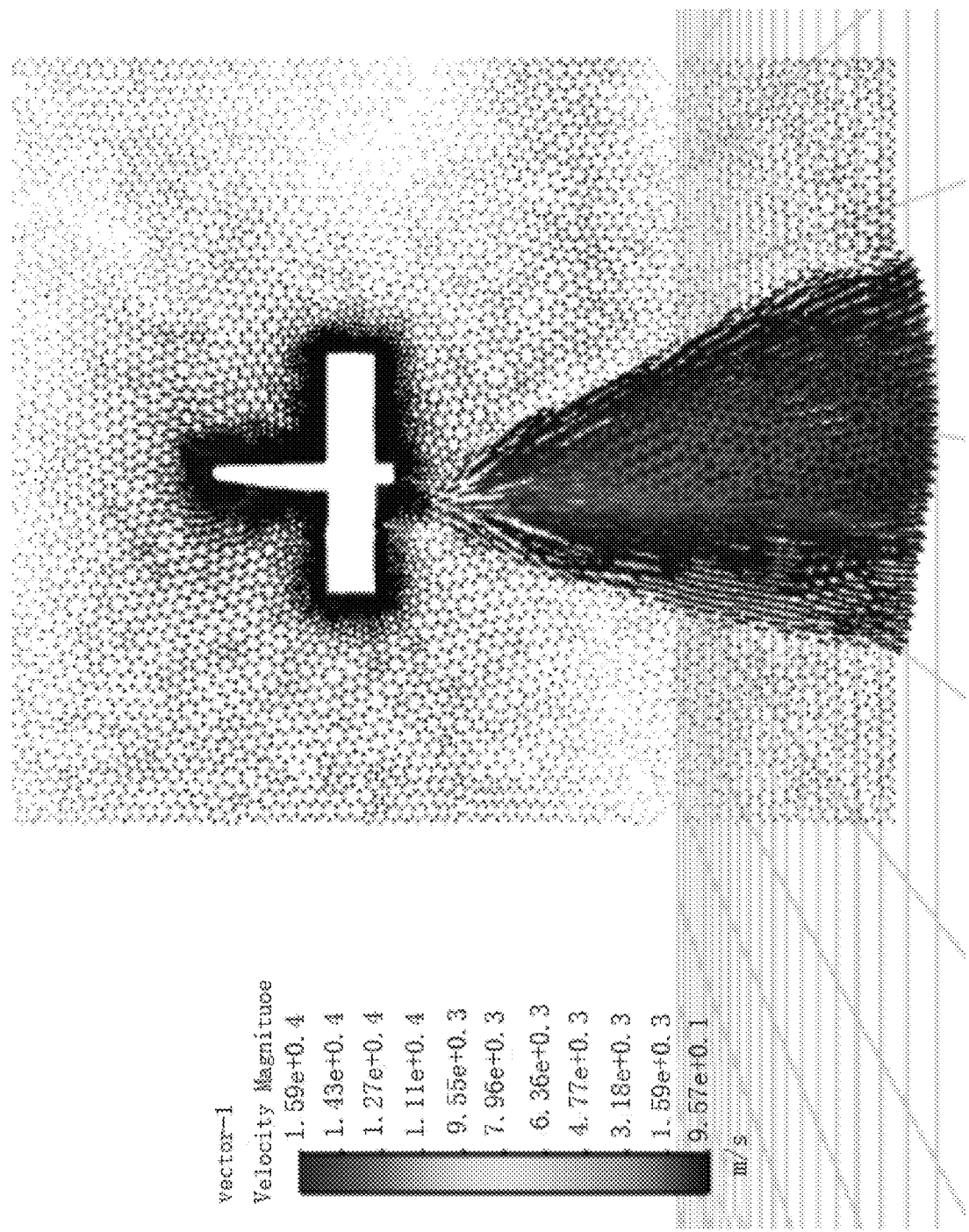
Figure 15:
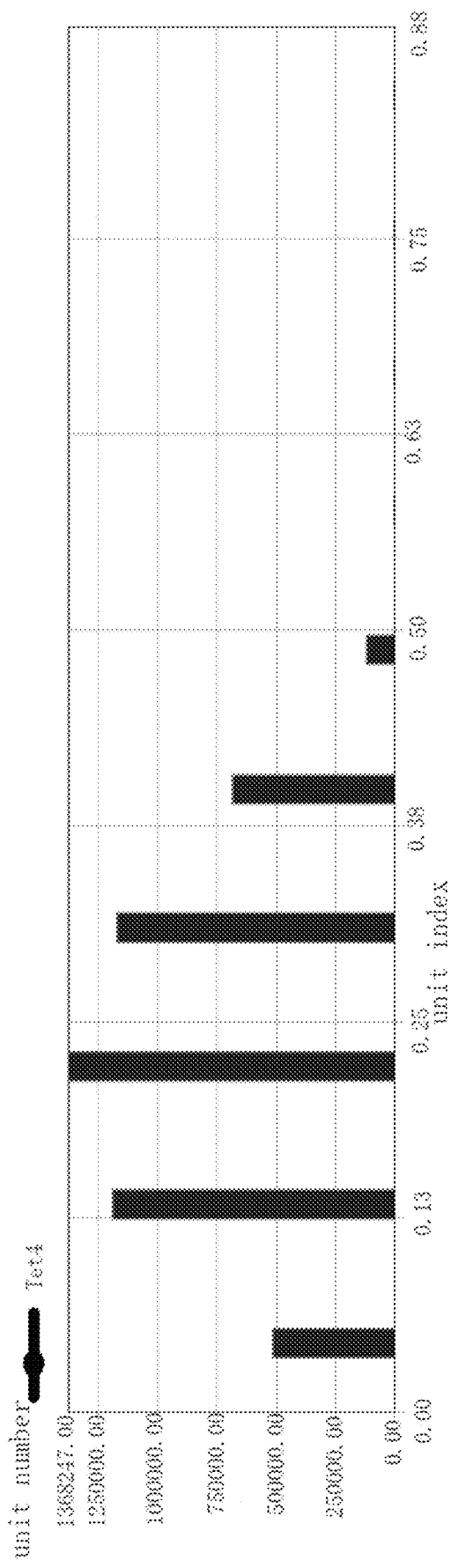

FIG. 12 is a lift diagram for Experimental group 2;

FIG. 13 is a thrust diagram for Experimental group 2;

FIG. 14 is a vector diagram for Experimental group 2;

FIG. 15 is a grid skewness of simulation software.

REFERENCE NUMBERS

100, airframe structure;
101, main airframe;
102, main wing; 1021, machine arm; 1022, propeller;
103, upper vertical tail wing;
104, lower vertical tail wing; 1041, bob-weight assembly;
105, horizontal tail wing;
Central axis A-1;
First rotating body α;
Second rotating body β.

DETAILED DESCRIPTION

Embodiments of the present disclosure will be described in greater detail below with reference to the accompanying drawings. Although certain embodiments of the present disclosure are shown in the accompanying drawings, it should be understood that the present disclosure may be realized in various forms and should not be construed as limited to the embodiments set forth herein. Rather, these embodiments are provided for a more thorough and complete understanding of the present disclosure. It should be understood that the accompanying drawings and embodiments of the present disclosure are provided for exemplary purposes only and are not intended to limit the scope of protection of the present disclosure.

It is also to be noted that for ease of description, only portions relevant to the invention in question are shown in the accompanying drawings. The embodiments and the features in the embodiments in the present disclosure may be combined with each other without conflict.

The present disclosure will be described in detail below with reference to the accompanying drawings and in connection with embodiments.

Embodiment I

Figure 1:
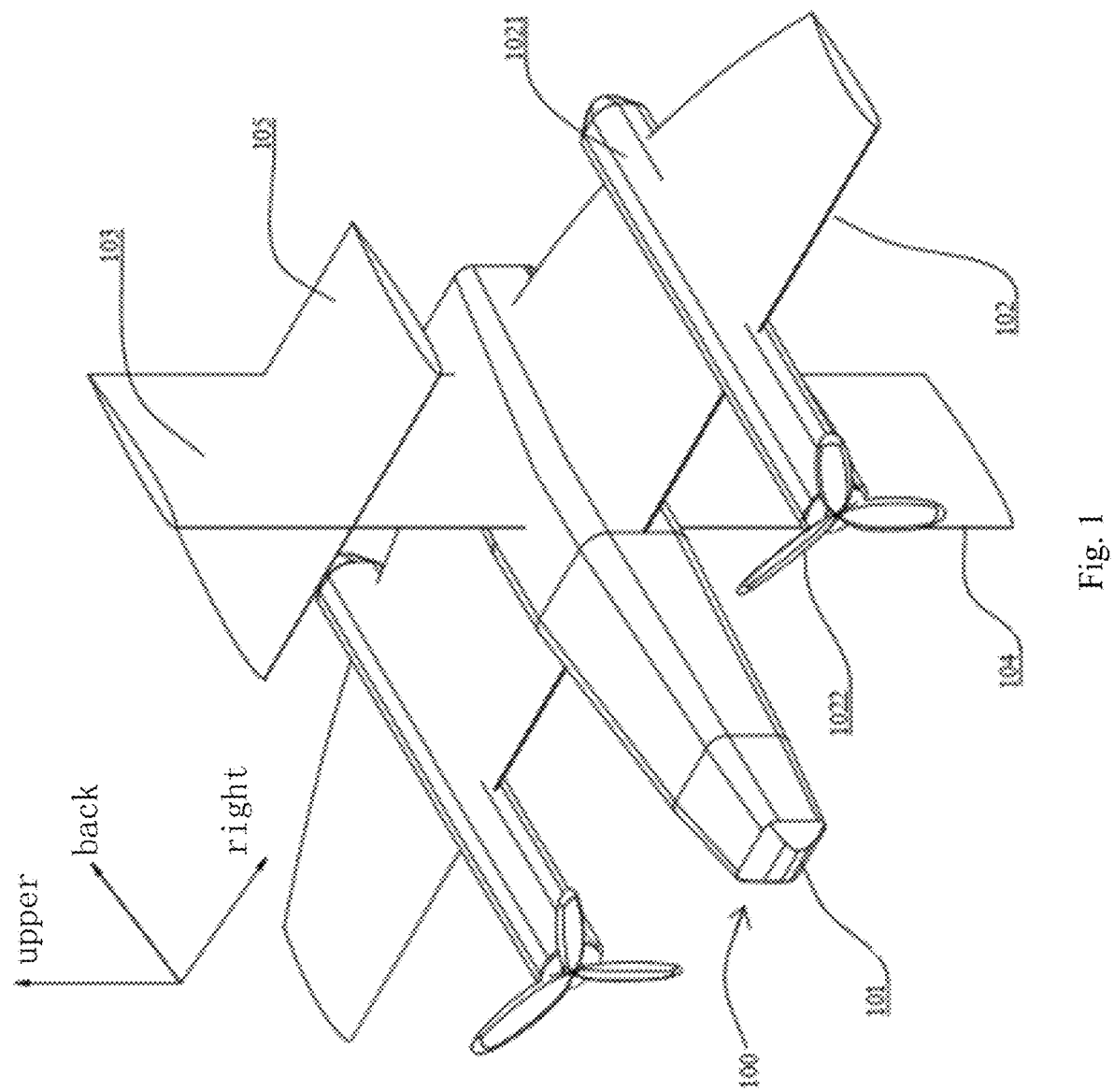

Referring to FIG. 1, an airframe structure 100 includes a main airframe 101, a main wing 102, an upper vertical tail wing 103, a lower vertical tail wing 104, and a horizontal tail wing 105. The main airframe 101 forms a main part of an aircraft. A freight house (not shown) for storing goods can be constructed on the main airframe 101. In addition, electronic element members, a control system, and an airspeed tube may all be integrated on the main airframe 101.

At least two main wings 102 are disclosed. The two main wings 102 are symmetrically provided on the two sides of the main airframe 101. A machine arm 1021 is fixedly connected to the main wing 102. A propeller 1022 and a motor are provided at the end of the machine arm 1021. The motor is fixed to the machine arm 1021. The propeller 1022 is rotatably provided on the machine arm 1021. The motor is an existing servo motor. A power output shaft of the motor and the propeller 1022 are connected by transmission. The motor is controlled by a control system integrated in the aircraft. The motor, after being started, drives the propeller 1022 to rotate, which in turn forms a main power for the flight of the aircraft employing the airframe structure 100.

The upper vertical tail wing 103 and the lower vertical tail wing 104 are both fixedly connected to the main airframe 101. The upper vertical tail wing 103 and the lower vertical tail wing 104 are provided above and below the main airframe 101, respectively.

The first rotating body α formed by rotation of the airfoils of the upper vertical tail wing 103 and the lower vertical tail wing 104 around the central axis of the airframe structure 100 are both provided within the second rotating body β formed by rotation of the airfoils of the main wing 102 around the central axis of the main airframe 101.

The airframe structure 100 is typically a weight-symmetric structure, so that the central vertical plane is the plane of weight symmetry of the airframe structure 100. In the present application, the central vertical plane of the airframe structure 100 is the plane of symmetry of the main wing 101.

After passing over the tip of the wing, an airflow flows along the surface of the wing, and in turn air creates a suction force or pressure on the surface of the wing. Therefore, the airfoil is the aerodynamic surface of the wing.

Figure 2:
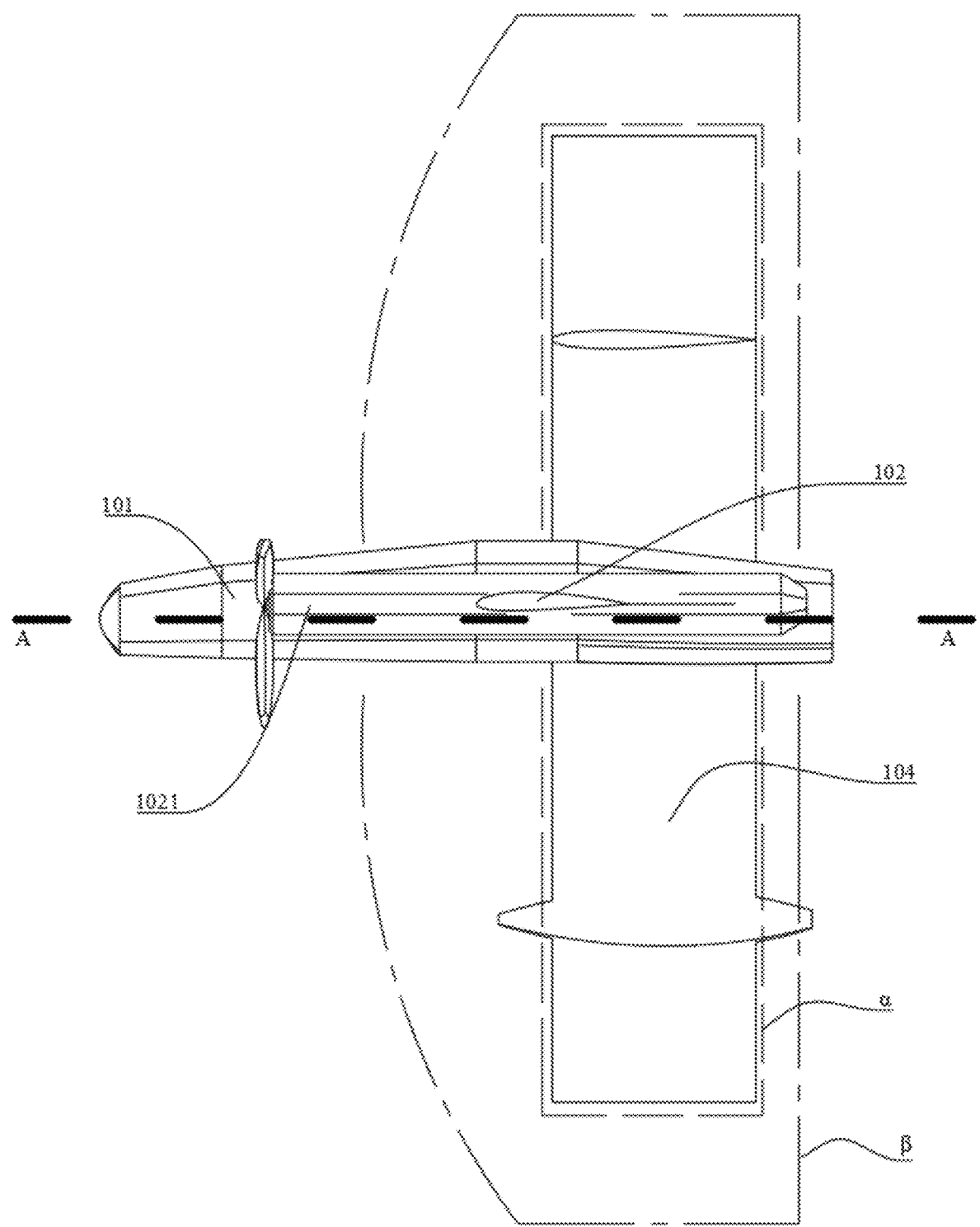

FIG. 2 shows the first rotating body α formed by rotation of the airfoils of the upper vertical tail wing 103 and the lower vertical tail wing 104 around the central axis of the airframe structure 100 as well as the second rotating body β formed by rotation of the airfoils of the main wing 102 around the central axis of the main airframe 101.

The horizontal tail wing 105 is fixedly connected to the upper vertical tail wing 103. The at least two horizontal tail wings 105 are disclosed. The two horizontal tail wings 105 are provided on the left and right sides of the upper vertical tail wing 103. The direction of arrangement of the airfoil of the horizontal tail wing 105 and the direction of arrangement of the airfoil of the main wing 102 are parallel to each other. The direction of arrangement of the airfoil of the horizontal tail wing 105 and the direction of arrangement of the airfoil of the upper vertical tail wing 103 are perpendicular to each other.

The main wing 102, the upper vertical tail wing 103, the lower vertical tail wing 104, and the horizontal tail wing 105 are NACA airfoils. An aircraft using such NACA airfoils has a faster flight rate.

In more specific embodiments, the main wing 102, the upper vertical tail wing 103, the lower vertical tail wing 104, and the horizontal tail wing 105 of the present application use NACA0009 and NACA2412 airfoils.

Figure 3:
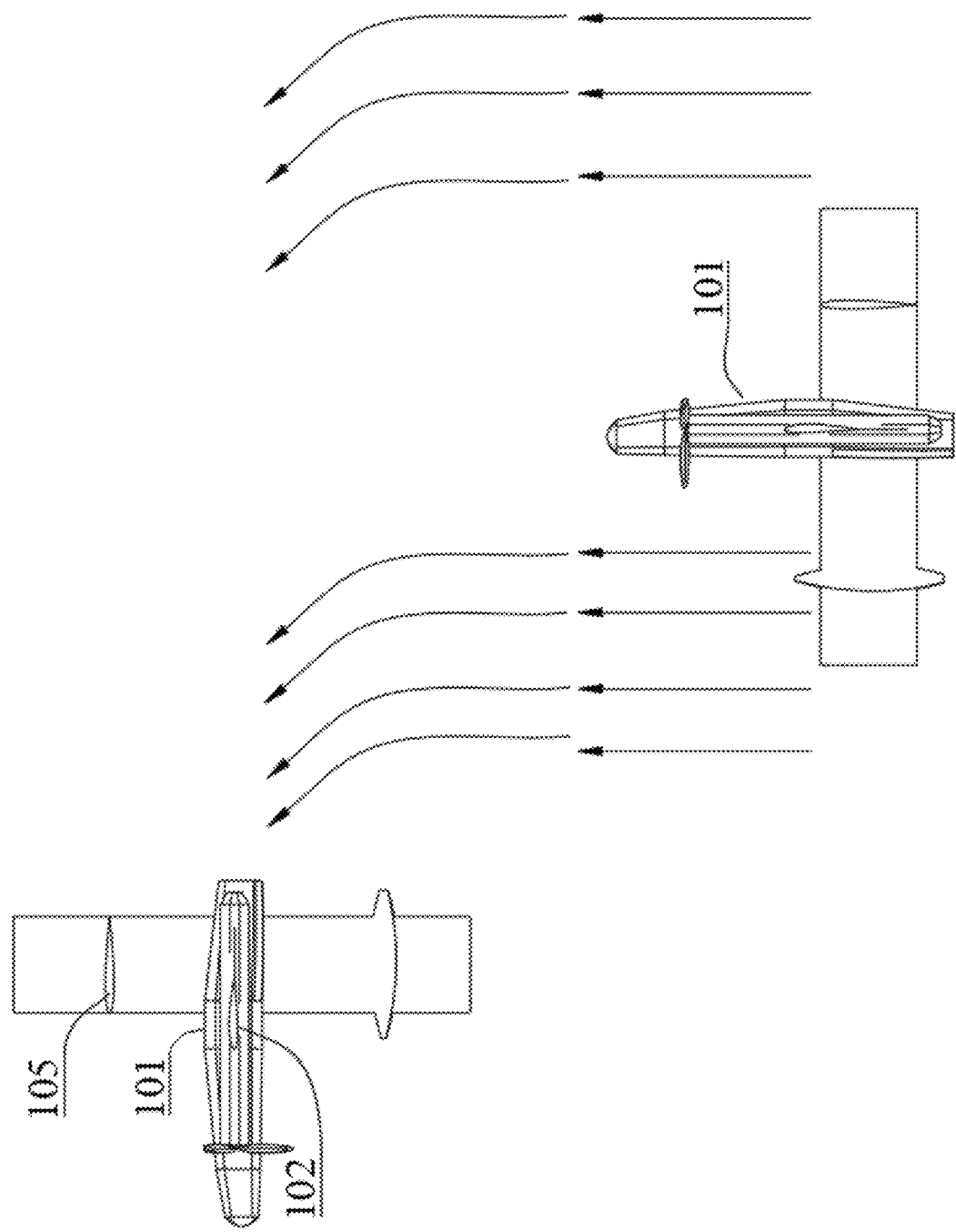

Referring to FIG. 3, FIG. 3 shows a state of the aircraft using the airframe structure 100 provided in the present application when the aircraft is transformed from a vertical takeoff state to horizontal flight.

When the aircraft using the airframe structure 100 provided in the present application performs vertical takeoff, the main airframe 101 is arranged facing upward. The whole airframe takes off vertically upward, so that there is no need for approach or taxiing during a takeoff phase, and there is no need to set up a corresponding runway for the aircraft or to provide the runway with a larger length.

When the aircraft using the airframe structure 100 provided in the present application takes off vertically, the state in which the symmetry plane of the main airframe 101 is perpendicular to the ground is switched to a state in which the symmetry plane is horizontal to the ground. In this state, the aircraft has a higher flight rate, uses less energy to fly, and can have a greater range while carrying the same energy supply.

When an aircraft is transformed from a vertical flight state to a horizontal flight state, because the main wing 102 adopts the NACA airfoil, a lot of turbulence and disturbance is generated in the tip of the main wing 102 and at the position of the propeller. The horizontal tail wing 105 can block these turbulence and disturbance (constraining a generated airflow), so that the aircraft is more stable when the aircraft is transformed from the vertical flight state to the horizontal flight state.

Figure 4:
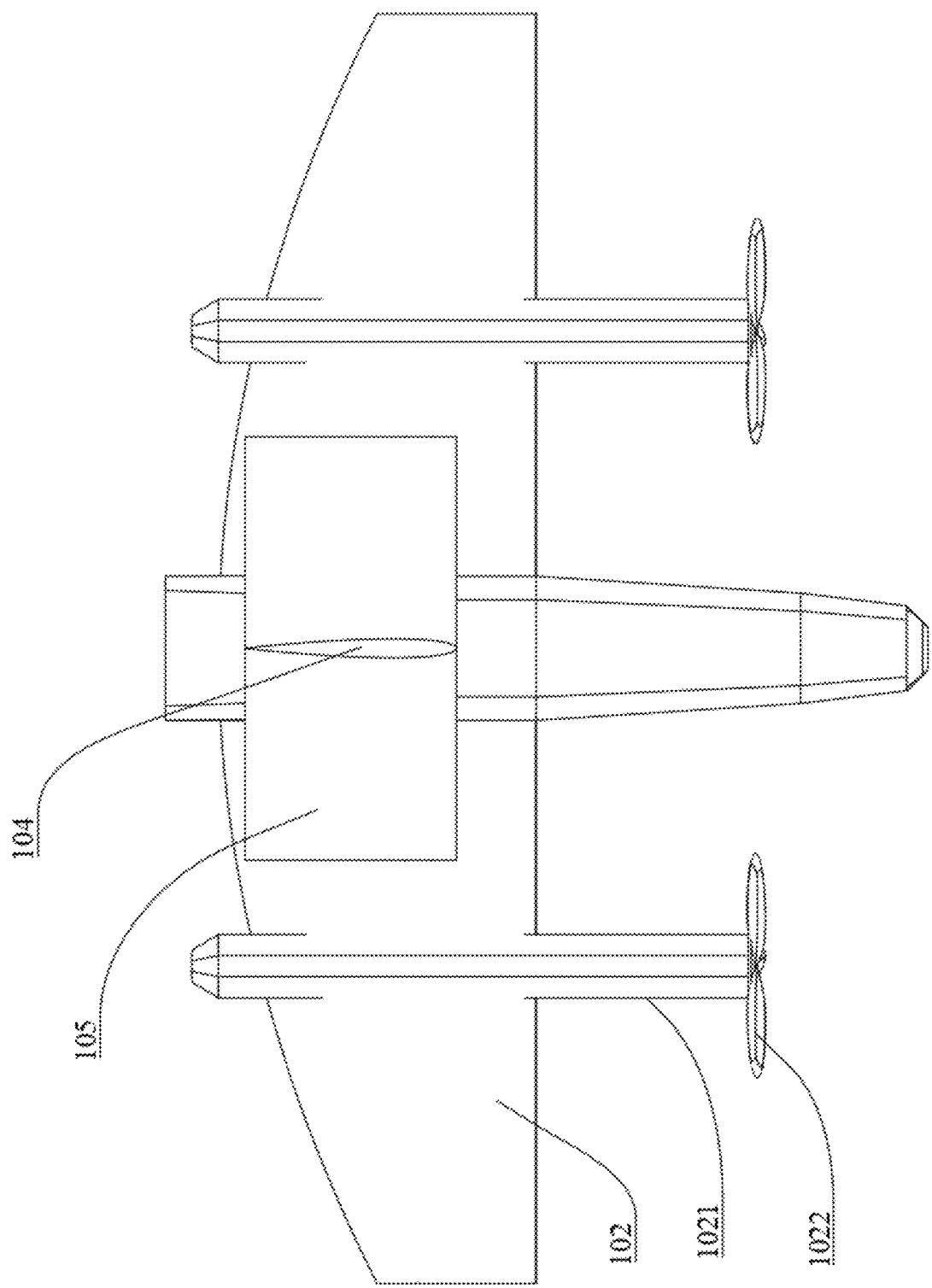

Referring to FIG. 4, a projection of the horizontal tail wing on the surface of the main wing is located on the main wing. In this way, the horizontal tail wing is located directly above the main wing, which in turn provides a better blocking effect on the disturbance and turbulence generated by the main wing.

Figure 5:
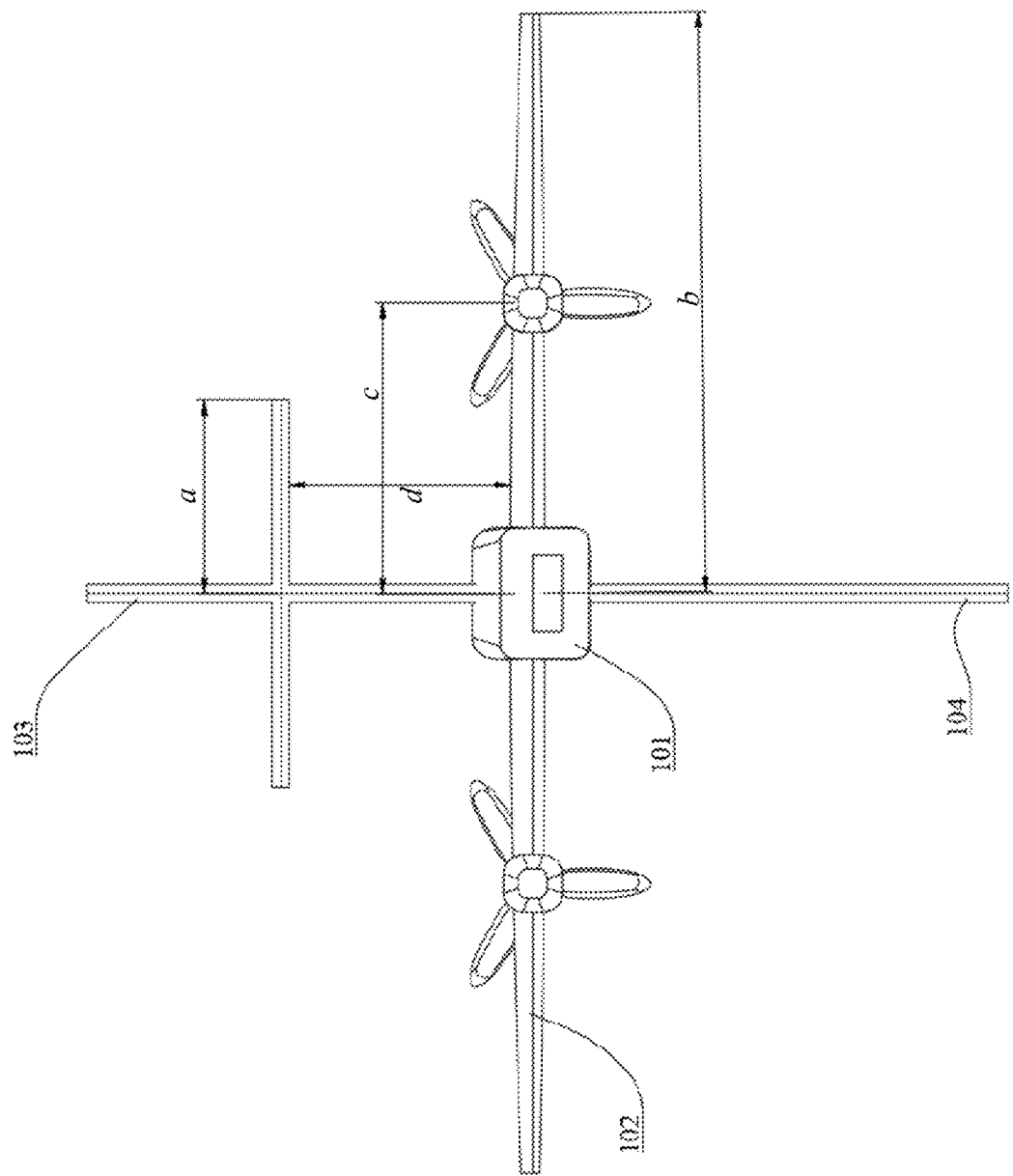
Figure 6:
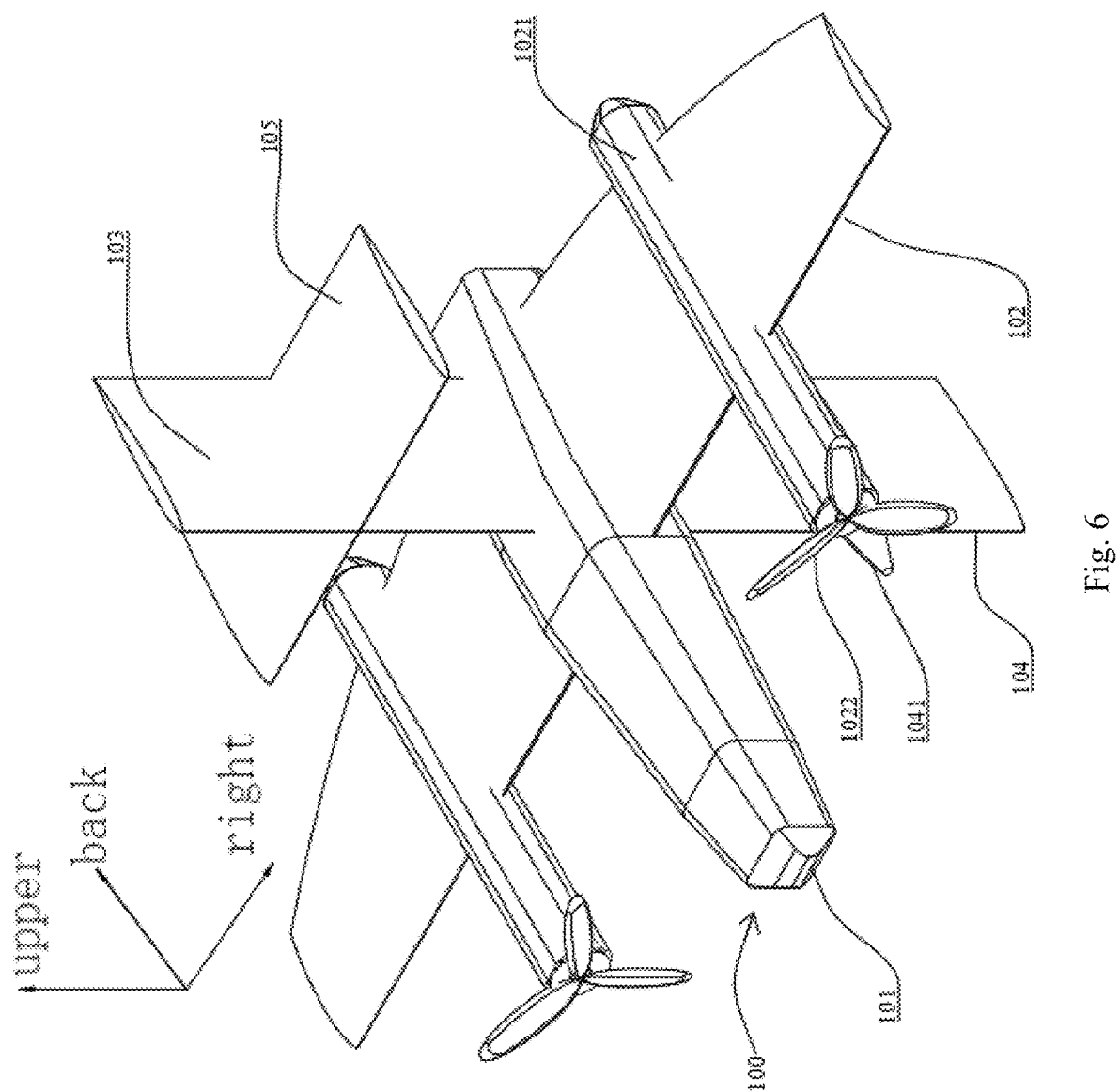
Figure 7:
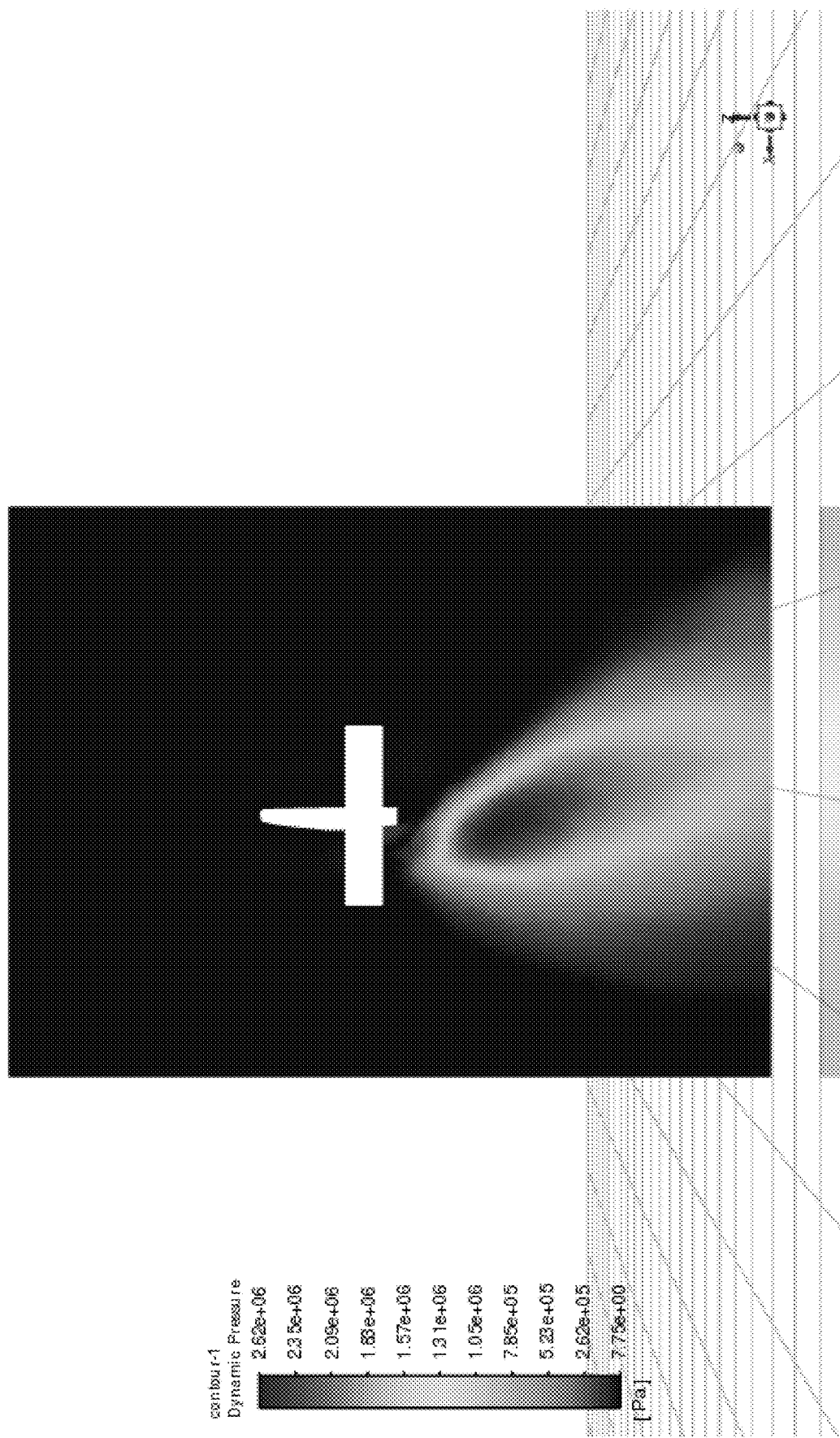
Figure 8:
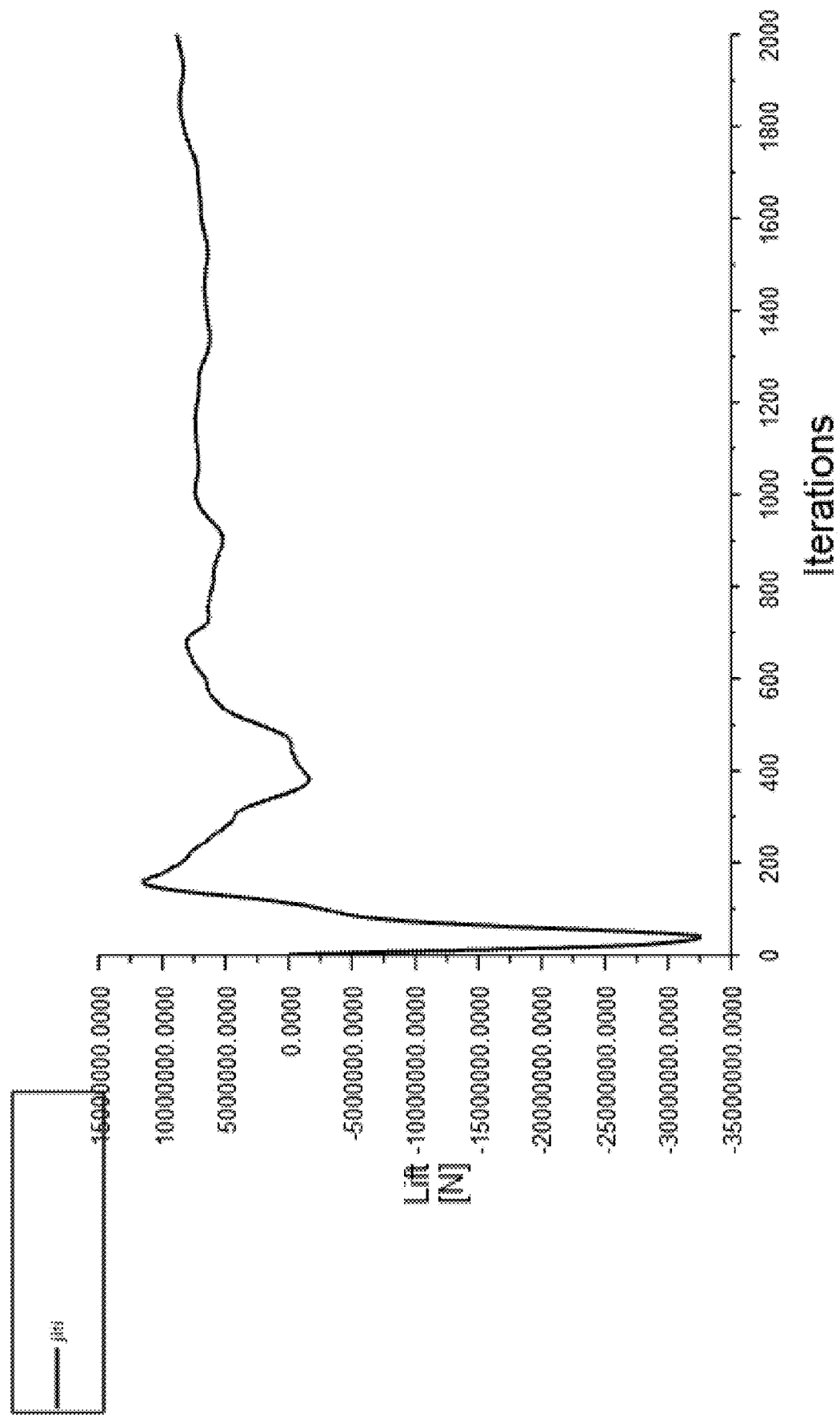
Figure 9:
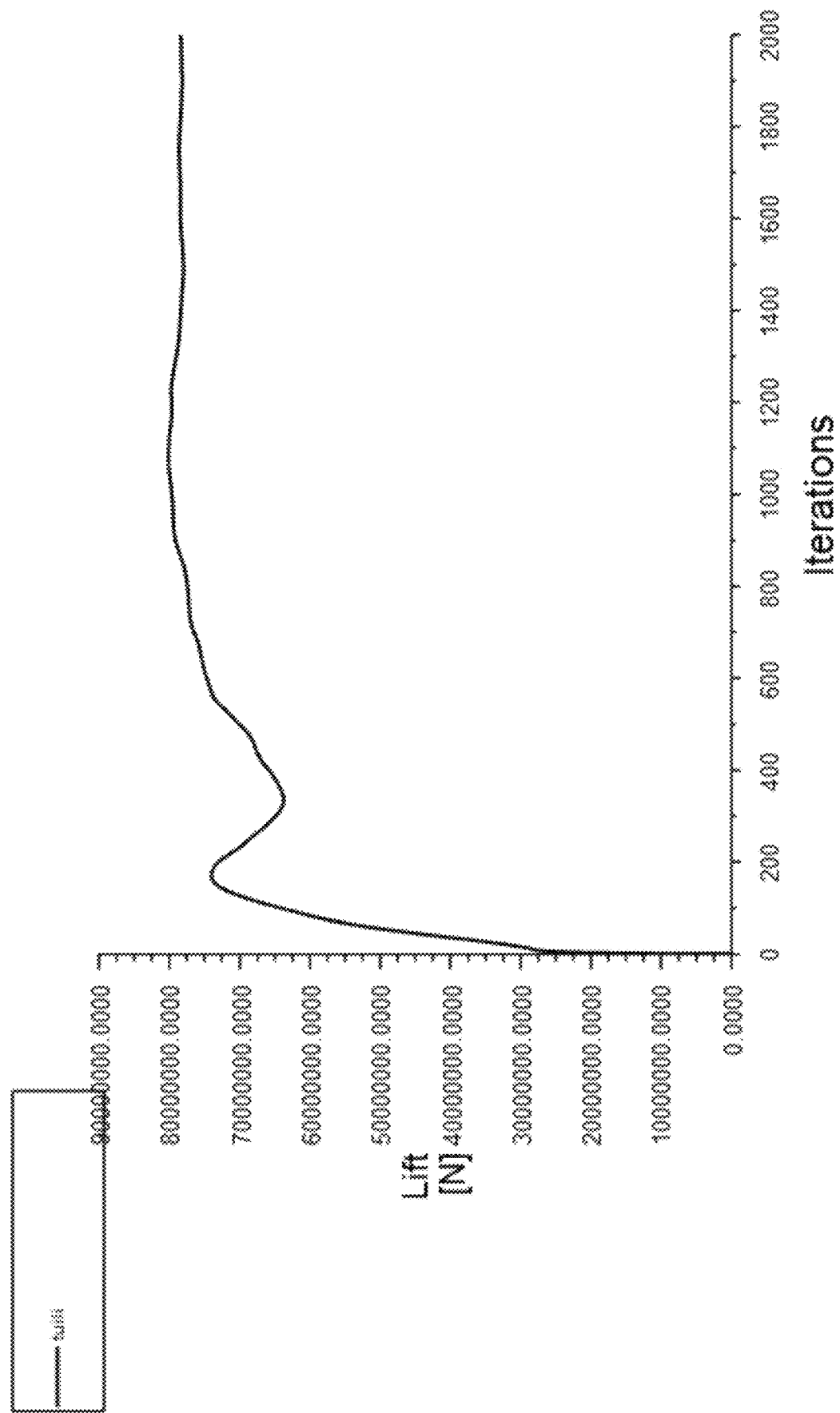
Figure 10:
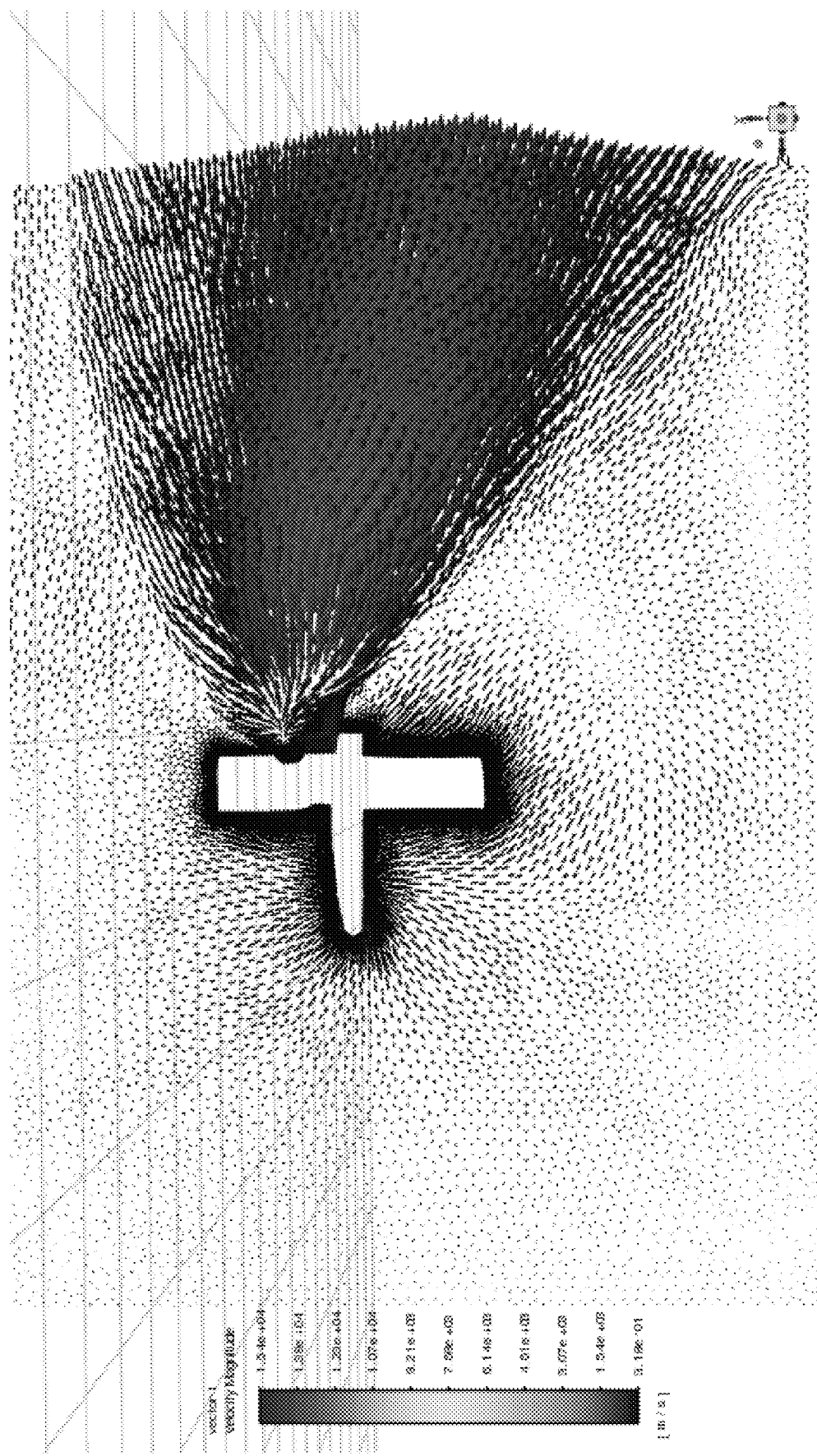
Figure 11:
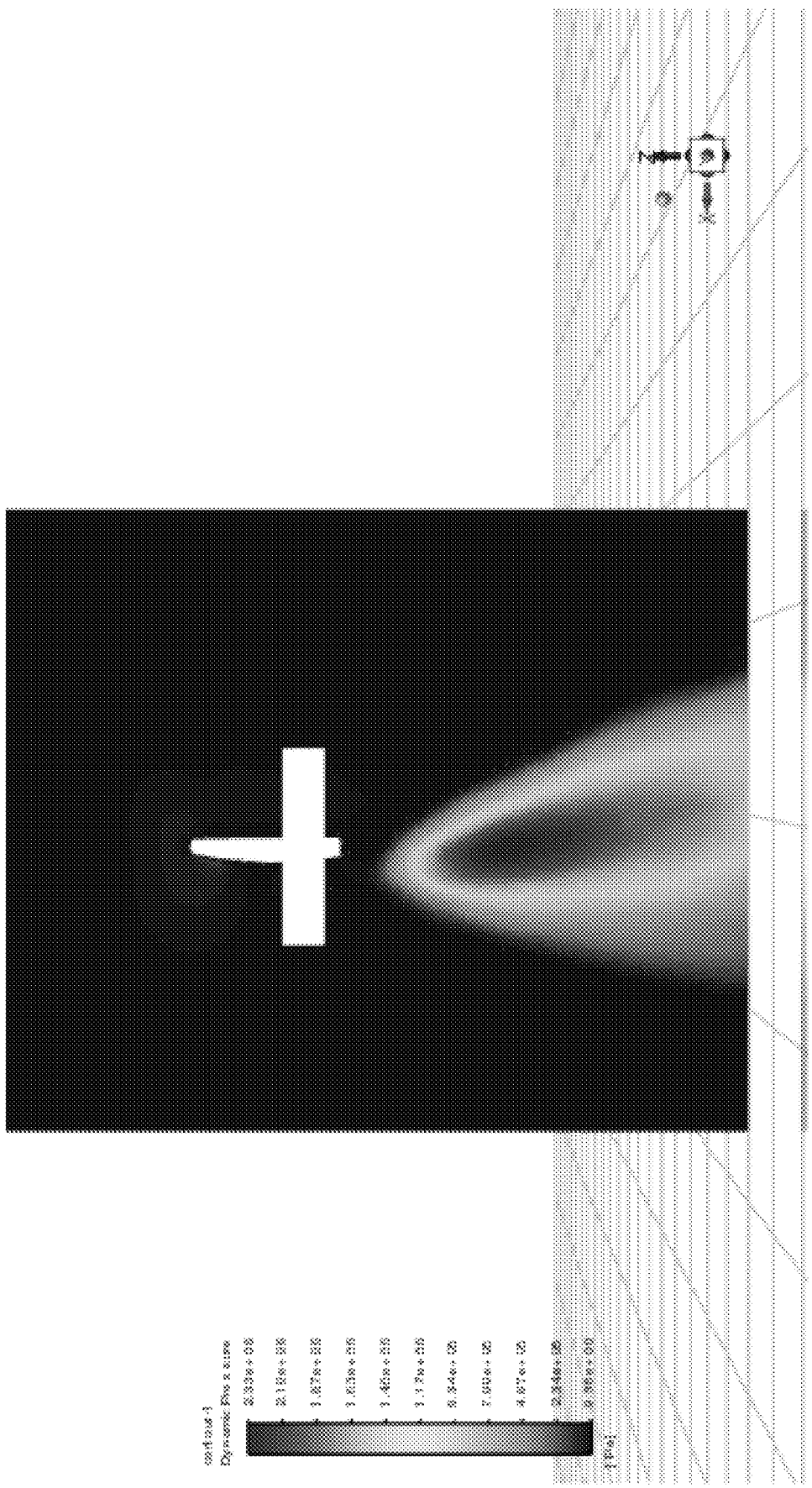

Referring to FIG. 5, FIG. 6 shows the proportional relationship of the horizontal tail wing and the main wing.

A distance a from the end of the horizontal tail wing 105 to the symmetry plane of the main airframe 101 is disclosed. A distance from the end of the main wing 102 to the symmetry plane of the main airframe 101 is b, and a:b=(30-35):(95-100); preferably, a:b=32:96.

A horizontal distance c from the axis of rotation of the propeller 1022 to the symmetry plane of the main airframe 101 is disclosed, and a:c=(30 to 35):(45-50); preferably, a:c=32:48.

A vertical distance d from the bottom surface of the horizontal tail wing 105 to the tip of the main wing 102 is disclosed, and a:d=(30-35):(15-80), preferably a:d=32:36.

The symmetry plane mainly refers to the symmetry plane of the mass symmetry of the main body, which is usually more uniformly distributed, so that one symmetry plane with mass symmetry of left and right sides can be found on the main airframe.

The horizontal tail wing 105 is mainly configured to block turbulence and disturbance generated by the propeller 1022. The closer the horizontal tail 105 is to the main wing 102, the better effect in blocking the turbulence and disturbance generated by the propeller 1022, because the closer it is to the propeller 1022 on the main wing. However, accordingly, the horizontal tail wing 105 is too close to the main wing 102, because a distance between the horizontal tail wing 105 and the main wing 102 becomes smaller, which leads to the increase of the gas pressure between the horizontal tail 105 and the main wing 102. Consequently, gas stability becomes poorer, so that the stability of a generated lift force and a thrust become poorer.

Of the above ratios, the above proportional relationship provided for the present application ensures the stability of the lift force while ensuring the optimal effect of the horizontal tail wing 105 on the turbulence blocking generated by the propeller.

The following table is two sets of simulation experimental data obtained by adjusting the value of d with the values of a, b and c taken as preferred values.

The experimental data for a distance of the horizontal tail wing from the main wing for the rest of the cases with the same ratio.

|  | Experimental group 1 | Experimental group 2 |
|---|---|---|
| A ratio of a vertical distance d from the horizontal tail wing to the main wing to a distance a from the end of the horizontal tail wing 105 to the symmetry plane of the main airframe 101 | 36:32 | 18:32 |

In FIGS. 7-10, the correlations of a dynamic pressure, a lift force, a thrust force, and a vector are shown for Experimental Group 1.

In FIGS. 11-14, the correlations of the dynamic pressure, the lift force, the thrust force, and the vector are shown for Experimental Group 2.

The dynamic pressure is analyzed. It can be found that in Experimental group 2, because the horizontal tail wing is closer to a direction of the main wing, the dynamic pressure becomes more concentrated. The dispersion of the dynamic pressure decreases. This indicates that a distance between the horizontal tail wing and the main wing is lowered, so that the dynamic pressure of the whole model increases. Therefore, accordingly, it is more advantageous for the dynamics of the aircraft.

The simulation results of the lift force and the thrust are analyzed. It can be found that the two simulation results match well. However, Experimental group 1 is smoother in a range of 1400-2000. Therefore, the stability of the thrust and the lift force in Experimental group 1 is better.

The simulation results of the vector are analyzed. It can be found that in Experimental group 1, airflow generated by the unmanned aerial vehicle during the flight is concentrated above the horizontal tail wing. Therefore, the flight stability of the unmanned aerial vehicle is high. In Experimental group 2, high-speed airflow generated is concentrated below the horizontal tail wing. There is also a lot of the high-speed airflow at the front end of the horizontal tail wing, so that the balance and stability of the airframe is not good.

In summary, although lowering the distance between the horizontal tail wing and the main wing can obtain better performance in terms of the dynamic pressure, in terms of the flight stability, the performance is not good enough. Therefore, the present application selects a:d=32:36 as a preferable embodiment, which can ensure the stability of the thrust and the lift force under the premise of obtaining the good dynamic pressure.

The simulation software sampled in this experiment is ansys. 10 million grids are disclosed. The maximum grid skewness is lower than 0.9. The quality of the grid is good, which indicates that the credibility of this experiment is high.

Embodiment 2

Referring to FIG. 1, FIG. 1 shows a three-dimensional view of an airframe structure.

A horizontal tail wing 105 needs to block wingtip disturbance generated from a main wing 102. Therefore, it is necessary for the horizontal tail wing 105 to have sufficient structural strength to provide better resistance to a wind pressure when blocking airflow.

To this end, Embodiment 2 provides the following technical solution based on Embodiment 1:

The horizontal tail wing 105 is provided in the middle of the upper vertical tail wing 103 so that the horizontal tail 105 and the upper vertical tail 103 form a cross-shaped wing.

In this way, regarding the shape of the horizontal tail wing 105 and the upper vertical tail wing 103 provided in Embodiment 2, compared to the solution that the horizontal tail wing 105 is provided at the tip of the upper vertical tail 103 to form a T-shaped wing, in the present application, the horizontal tail 105 is provided at the middle of the upper vertical tail wing 103, which can increase the stability of the horizontal tail wing 105, and thus enable the horizontal tail wing 105 to be strengthened in terms of anti-disturbance flow capability.

Embodiment 3

Referring to FIG. 6, FIG. 6 shows a three-dimensional view of an airframe structure, being labeled with the location of a bob-weight assembly.

To ensure that an aircraft has better stability during flight, it is necessary that the symmetry of the aircraft is sufficiently good. The gravity of the aircraft is evenly distributed during flight. However, because a horizontal tail wing 105 is connected to an upper vertical tail wing 103, the aircraft for using an airframe structure 100 provided by the present application has a mismatch in weight between the upper vertical tail wing 103 and the lower vertical tail wing 104 when the aircraft flies vertically.

To this end, this application also provides the following solution:

The lower vertical tail wing 104 is also provided with a bob-weight assembly 1041. The bob-weight assembly 1041 is provided in the middle of the lower vertical tail wing 104. The bob-weight tail can be configured to balance the gravity of the horizontal tail wing 105. When the aircraft for using the airframe structure 100 provided in the present application flies in a vertical state, one side of the upper vertical tail wing 103 and one side of the lower vertical tail wing 104 can be equal to each other.

In a more specific arrangement, the bob-weight assembly 1041 may be a bob-weight block fixedly connected to the lower vertical tail wing 104, or a device such as a sensor, a camera, and a bob-weight block that may be integrated into the lower vertical tail wing 104 to form the bob-weight assembly 1041.

Embodiment 4

An aircraft includes an airframe structure 100 as disclosed in Embodiments 1-3 above.

The forgoing description is only some of preferable embodiments of the present disclosure and an illustration of the technical principles utilized. A person skilled in the art should understand that the scope of the invention involved in the present disclosure is not limited to the technical solution formed by the specific combination of the forgoing technical features, and should also cover other technical solutions formed by any combination of the forgoing technical features or their equivalent features without departing from above inventive concept, for example, a technical solution formed by interchanging the forgoing features with (but not limited to) technical features having similar functions disclosed in embodiments of the present disclosure.

What is claimed is:

1. An airframe structure, comprising:
   a main airframe;
   at least two main wings, which are symmetrically provided on two sides of the main airframe, wherein each of the at least two main wings is provided with a propeller and a motor to provide power to the propeller;
   an upper vertical tail wing, which is provided at an upper end of the main airframe; and
   a lower vertical tail wing, which is provided at a lower end of the main airframe;
   wherein the upper vertical tail wing is provided thereon with at least two horizontal tail wings, the at least two horizontal tail wings are provided on left and right sides of the upper vertical tail wing, airfoils of the at least two horizontal tail wings and airfoils of the upper vertical tail wing are perpendicular to each other, the airfoils of the at least two horizontal tail wings and airfoils of the at least two main wings are parallel to each other, each of the at least two horizontal tail wings are located directly above a corresponding one of the at least two main wings, a first ratio of a distance a from an end of each of the at least two horizontal tail wings to a symmetry plane of the main airframe to a distance b from an end of each of the at least two main wings to the symmetry plane of the main airframe is (30-35):(95-100), and a second ratio of the distance a to a vertical distance d from a bottom surface of each of the at least two horizontal tail wings to an upper surface of the corresponding one of the at least two main wings is 32:36.

2. The airframe structure according to claim 1, wherein the at least two main wings and the at least two horizontal tail wings are NACA airfoils.

3. The airframe structure according to claim 1, wherein a third ratio of the distance a to a horizontal distance c from an axis of rotation of the propeller to the symmetry plane of the main airframe is (30-35):(45-50).

4. The airframe structure according to claim 1, wherein the lower vertical tail wing and the upper vertical tail wing are NACA airfoils.

5. The airframe structure according to claim 1, wherein the at least two horizontal tail wings are in a middle of the upper vertical tail wing.

6. The airframe structure according to claim 1, wherein the lower vertical tail wing further includes a bob-weight assembly.

7. An unmanned aerial vehicle, comprising the airframe structure according to claim 1.

* * * * *